(12) United States Patent
Ohman, III

(10) Patent No.: US 9,903,440 B2
(45) Date of Patent: Feb. 27, 2018

(54) SHACKLE WITH CAPTURED PIN ASSEMBLY

(71) Applicant: The Crosby Group LLC, Tulsa, OK (US)

(72) Inventor: Roger Ohman, III, Broken Arrow, OK (US)

(73) Assignee: The Crosby Group LLC, Tulsa, OK (US)

( * ) Notice: Subject to any disclaimer, the term of this patent is extended or adjusted under 35 U.S.C. 154(b) by 0 days.

(21) Appl. No.: 15/332,017

(22) Filed: Oct. 24, 2016

(65) Prior Publication Data

US 2017/0114861 A1    Apr. 27, 2017

Related U.S. Application Data

(60) Provisional application No. 62/246,410, filed on Oct. 26, 2015.

(51) Int. Cl.
| | |
|---|---|
| *F16G 11/00* | (2006.01) |
| *F16B 45/04* | (2006.01) |
| *F16G 15/06* | (2006.01) |

(52) U.S. Cl.
CPC .............. *F16G 11/00* (2013.01); *F16B 45/04* (2013.01); *F16G 15/06* (2013.01)

(58) Field of Classification Search
CPC ........... F16B 45/04; F16G 11/00; F16G 15/06
See application file for complete search history.

(56) References Cited

U.S. PATENT DOCUMENTS

| | | | | |
|---|---|---|---|---|
| 2,097,465 | A * | 11/1937 | Morrison | F16G 15/06 |
| | | | | 278/96 |
| 2,259,217 | A * | 10/1941 | Stevenson | F16G 15/06 |
| | | | | 411/217 |
| 2,449,593 | A * | 9/1948 | Drake | B63B 21/04 |
| | | | | 114/114 |
| 4,095,416 | A | 6/1978 | Issard | |
| 4,145,874 | A * | 3/1979 | Muller | F16G 15/06 |
| | | | | 59/86 |
| 4,337,614 | A * | 7/1982 | Briscoe | F16G 15/06 |
| | | | | 411/518 |

(Continued)

FOREIGN PATENT DOCUMENTS

| | | |
|---|---|---|
| EP | 2434179 | 3/2012 |
| GB | 19625 | 0/1914 |
| WO | 89/00249 | 1/1989 |

*Primary Examiner* — Robert Sandy
*Assistant Examiner* — David M Upchurch
(74) *Attorney, Agent, or Firm* — Head, Johnson, Kachigian & Wilkinson, PC

(57) ABSTRACT

A shackle with captured pin assembly. The shackle includes a pair of opposed legs. A first ear for one of the opposed legs includes an opening therethrough to receive a shackle pin. A recess in the opening receives a spring clip surrounding a shaft of the shackle pin. A second ear for another of the opposed legs is opposed to the first ear. The second ear has an opening therethrough to receive the shackle pin and has an opening with a threaded portion. The shackle pin has a head, a threaded portion engageable with the threaded portion of the second ear opening, and a reduced diameter portion. The rotating retaining clip rotates about an axis parallel to the shackle pin between a locked and an unlocked position.

14 Claims, 16 Drawing Sheets

(56) References Cited

U.S. PATENT DOCUMENTS

| | | | |
|---|---|---|---|
| 4,423,610 A | | 1/1984 | Hart |
| 5,046,881 A * | | 9/1991 | Swager ................ F16D 25/082 |
| | | | 403/154 |
| 5,114,260 A * | | 5/1992 | Hart ........................ F16G 15/06 |
| | | | 403/154 |
| 5,433,547 A * | | 7/1995 | Hart ........................ F16B 39/32 |
| | | | 403/154 |
| 5,597,260 A * | | 1/1997 | Peterson ................ F16B 21/04 |
| | | | 403/316 |
| 7,393,033 B1 * | | 7/2008 | Bisso, IV ............... F16G 15/06 |
| | | | 294/82.1 |
| 7,540,140 B1 * | | 6/2009 | Diaz ....................... F16G 15/06 |
| | | | 403/154 |
| 8,104,988 B2 * | | 1/2012 | Lunn ...................... F16G 15/06 |
| | | | 403/154 |
| 8,381,363 B2 | | 2/2013 | Boeckman et al. |
| D708,042 S * | | 7/2014 | Moreau .......................... D8/331 |
| 8,864,203 B1 * | | 10/2014 | Menduni ............... E21B 19/002 |
| | | | 294/215 |
| D770,884 S * | | 11/2016 | Moreau .......................... D8/382 |
| 2011/0265442 A1 * | | 11/2011 | Segura ...................... B66C 1/10 |
| | | | 59/86 |
| 2012/0073088 A1 * | | 3/2012 | Boeckman .............. F16G 15/06 |
| | | | 24/132 WL |
| 2012/0159987 A1 * | | 6/2012 | Walchle ................. F16B 45/00 |
| | | | 63/3.2 |
| 2013/0074469 A1 * | | 3/2013 | Robins ................... F16G 15/06 |
| | | | 59/86 |
| 2015/0121836 A1 * | | 5/2015 | Moreau .................. F16G 15/06 |
| | | | 59/86 |

\* cited by examiner

SHACKLE WITH CAPTURED PIN ASSEMBLY

CROSS-REFERENCE TO RELATED APPLICATIONS

This application claims priority to and the benefit of U.S. Provisional Patent Application Ser. No. 62/246,410, filed Oct. 26, 2015, which is herein incorporated in its entirety by reference.

BACKGROUND OF THE INVENTION

1. Field of the Invention

The present invention is directed to a shackle with captured pin assembly. The present invention is also directed to a shackle having a rotating retaining clip which rotates about an axis parallel to the shackle pin between a locked and an unlocked position.

2. Prior Art

Shackles are known devices used to join sling cables or ropes together or used to connect a cable or rope to a load. Shackles are utilized in a wide variety of applications including lifting applications, tie-down applications, towing applications, or suspension applications.

Known types of shackles include a screw-pin type wherein the shackle pin or bolt is received in a threaded opening in one of the ears of the shackle. Other types of shackles include bolt-type shackles with a pin or bolt passing through opposed ears, a threaded nut and an optional secondary cotter pin or a clip.

Applicant's prior patent (U.S. Pat. No. 8,381,363) illustrates a securing mechanism for a shackle having a two piece hinged clamp assembly which may be installed or removed using only small hand tools.

Shackles are often utilized in extreme and hazardous conditions where even use of hand tools is difficult.

It would be desirable to provide a securing mechanism for a shackle bolt for a shackle which is installable and removable without any tools.

It would also be desirable to provide a securing mechanism for a shackle having a rotating locking clip which rotates between a locked position and an unlocked position.

It would be desirable to provide a securing mechanism for a shackle bolt for a shackle having a locking clip which eliminates any need for a cotter pin or other secondary retaining mechanism.

In many work sites, dropped objects are a problem to be avoided. It would also be desirable to provide a shackle bolt with captured pin assembly wherein all components of the assembly remain with the assembly at all times and none of the elements are separated from the assembly.

It would also be desirable to provide a shackle with captured pin assembly which may be moved between a locked and unlocked position in subsea conditions by mechanical or robotic actuators.

SUMMARY OF THE INVENTION

The present invention is directed to a shackle with captured pin assembly. The assembly includes a shackle having a pair of extending, opposed legs which form an open mouth.

Each of the legs terminates in a corresponding ear. One of the opposed legs includes a first ear having a substantially cylindrical opening therethrough. A recess in the cylindrical opening in the first ear receives a split ring retaining spring clip.

Another leg includes a second ear having a cylindrical opening therethrough to receive a shackle pin. At least a portion of the opening in the second ear is threaded to receive a threaded portion of the shackle pin.

The shackle pin also has a reduced diameter portion having a smaller diameter than the threaded portion of the shackle pin.

In one preferred embodiment, a rotating locking clip rotates about an axis parallel to the shackle pin between a locked and an unlocked position.

The rotating locking clip has a slot which provides an opening smaller than the diameter of the shackle pin. When in the locked position, the slot of the rotating locking clip is received over the reduced diameter portion of the shackle pin. Once the rotating locking clip is in place over the reduced diameter portion of the shackle pin, the shackle pin is prevented from being retracted or removed.

Once the locking clip has been rotated to the unlocked position, the locking clip is no longer in place over the reduced diameter portion of the shackle pin. The shackle pin may then be unthreaded so that the threaded portion of the shaft is disengaged from the threaded portion of the opening of the second ear.

As the shackle pin is axially retracted into the first ear, the spring clip will engage a groove in the shackle pin so that the spring clip reduces in diameter into the groove. As the shackle pin continues to be retracted, the split ring retaining clip will engage a wall of a lip or protruding portion of the shackle pin so that the shackle pin will be prevented from being withdrawn further. Accordingly, the shackle pin never becomes disengaged from the shackle. All of the component parts or elements remain with the assembly at all times.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
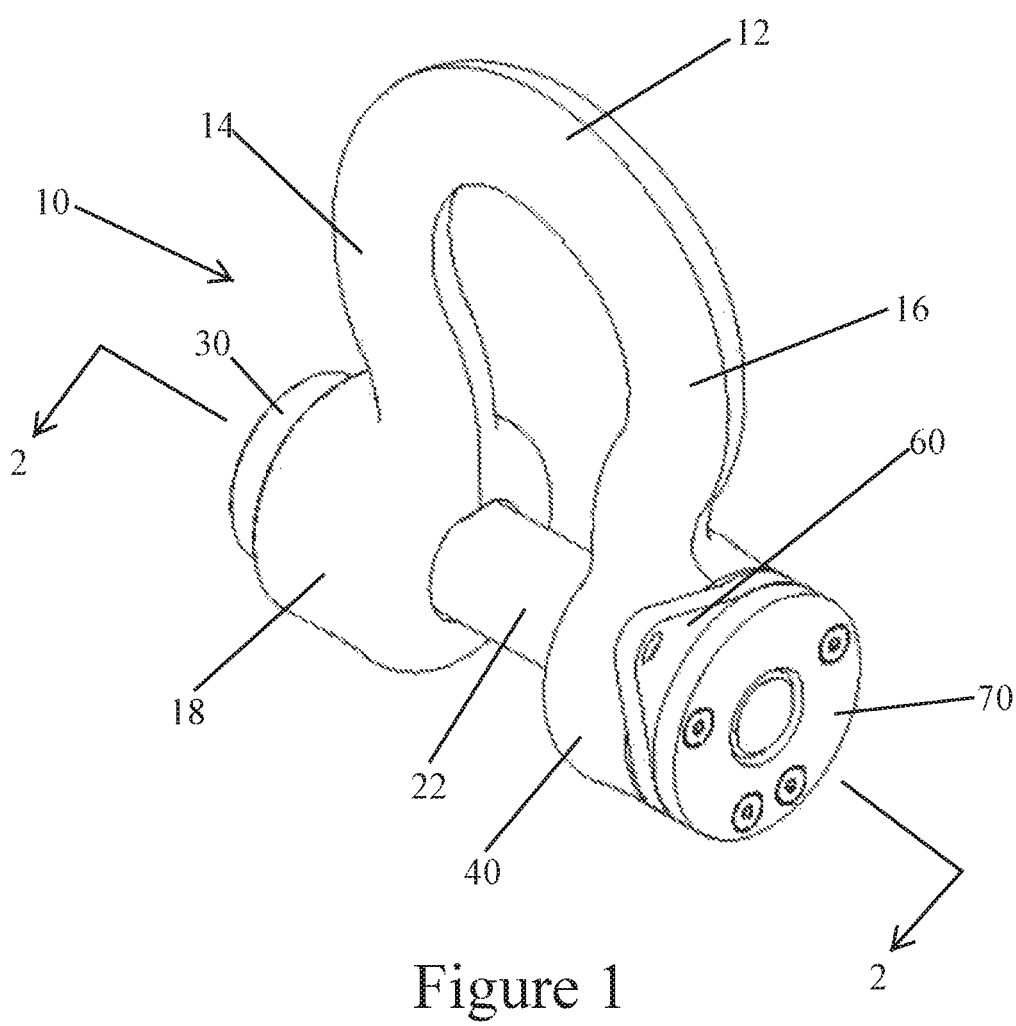
FIG. 1 illustrates a perspective view of a shackle with captured pin assembly constructed in accordance with the present invention shown in a locked position.
Figure 2:
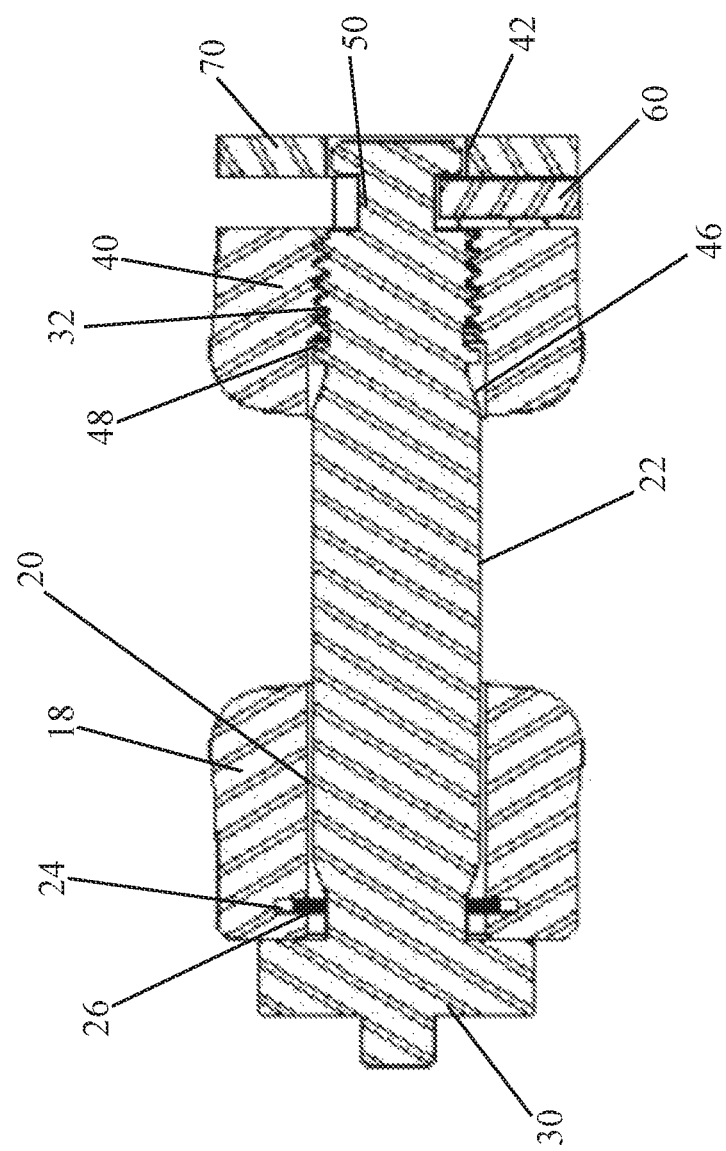
FIG. 2 illustrates a sectional view of the shackle with captured pin assembly of the present invention taken along section line 2-2 of FIG. 1.
Figure 3:
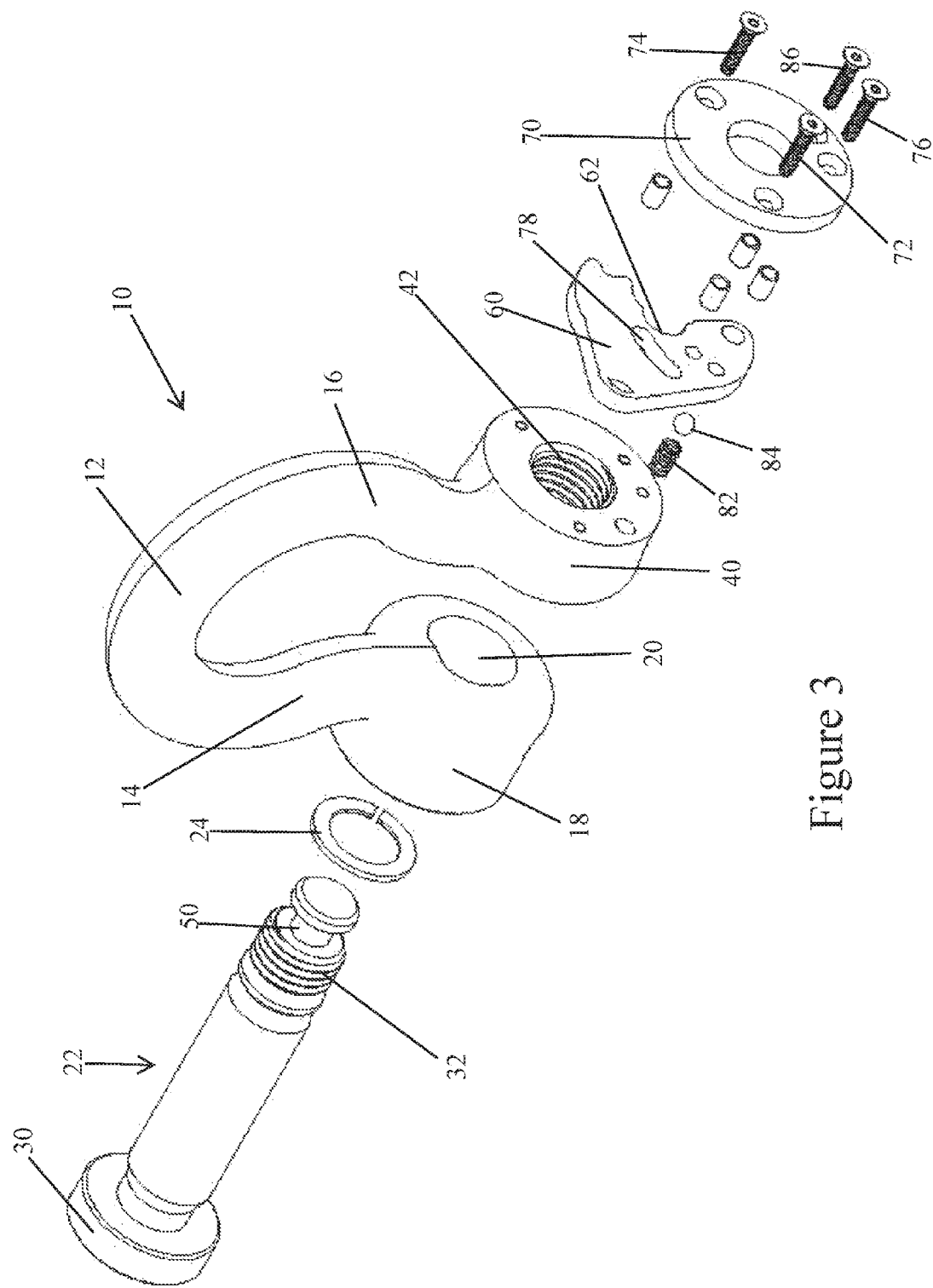
FIG. 3 illustrates an exploded view of the shackle with captured pin assembly shown in FIG. 1.

Referring to the drawings in detail, FIG. 1 illustrates a perspective view of a first preferred embodiment of a shackle with captured pin assembly 10 constructed in accordance with the present invention. FIG. 2 illustrates a sectional view taken along section line 2-2 of FIG. 1. FIG. 3 illustrates an exploded view of the shackle with captured pin assembly 10 as shown in FIG. 1.

As will be described in detail herein, the assembly 10 is moveable between a locked position shown in FIGS. 1 and 2 and an unlocked position.

The assembly 10 includes a shackle 12 having a pair of extending, opposed legs 14 and 16 which form an open mouth. Various types of shackles may be employed within the spirit and scope of the invention. Each of the legs 14 and 16 of the shackle terminates in a corresponding ear. One of the opposed legs 14 includes a first ear 18 having a substantially cylindrical opening 20 therethrough to receive a shackle bolt or pin 22.

An annular recess 24 (visible in FIG. 2) in the opening 20 in the first ear 18 receives a split ring retaining spring clip 26 which surrounds a shaft of the shackle pin 22. The spring clip 26 exerts a force urging reduction of the inner diameter opening of the clip 26.

The shackle bolt or shackle pin 22 includes a head 30 at one end having a diameter larger than the cylindrical opening 20 in the first ear 18. The shackle pin 22 also includes a threaded portion 32 of the shaft at an opposed end to the head 30.

Another leg 16 of the shackle includes a second ear 40 having an opening 42 therethrough to receive the shackle pin 22. The opening 42 in the second ear 40 is aligned with the opening 20 in the first ear 18. At least a portion of the opening 42 in the second ear 40 is threaded to receive the threaded portion 32 of the shackle pin 22.

In one configuration, the threaded engagement of the shackle pin 22 with the threaded portion of the opening 42 is the primary mechanism to retain or secure the shackle pin 22 to the shackle, although other configurations are possible within the spirit and scope of the present invention.

It will be appreciated that the teachings of the present invention may also be applied to a non-threaded shackle pin.

The shackle pin 22 also has a reduced diameter portion 50, with a smaller diameter than the threaded portion 32 of the shackle pin. The reduced diameter portion 50 is near but not at the end of the shackle pin 22 opposed to the head 30 of the shackle pin.

As will be described in detail, a rotating locking clip 60 rotates about an axis parallel to, but spaced from, the shackle pin 22 between a locked position and an unlocked position.

The shackle pin 22 has a groove 46 adjacent to a lip or radially protruding portion 48 protruding from the shaft of the shackle pin 22. The groove 46 has a diameter less than the diameter of the cylindrical shackle pin 22.

As best seen in the exploded view in FIG. 3, the rotating locking clip 60 has a slot 62 which provides an opening smaller than the diameter of the shackle pin 22. When in the locked position as shown in FIGS. 1 and 2, the slot 62 of the rotating locking clip 60 is received over the reduced diameter portion 50 of the shackle pin 22. Once the rotating locking clip 60 is in place over the reduced diameter portion 50 of the shackle pin 22, the shackle pin 22 is prevented from being axially retracted or withdrawn. Accordingly, the shackle pin 22 is locked in place.

In one preferred embodiment shown, an optional cover 70 is secured to the second ear 40 by a series of fasteners 72, 74, 76 and 86. The fasteners pass through the cover 70 and into the second ear 40. One fastener 72 acts as an axis for rotation of the rotating locking clip 60. Accordingly, the rotating locking clip 60 rotates about an axis parallel to, but spaced from, the axis of the shackle pin 22.

At least one of the other fasteners passes through a slot 78 in the rotating locking clip 60. Accordingly, the locking clip 60 may rotate without interference from the fasteners. Four fasteners are utilized in the present embodiment, although a greater or lesser number may be employed within the spirit and scope of the present invention.

Figure 4:
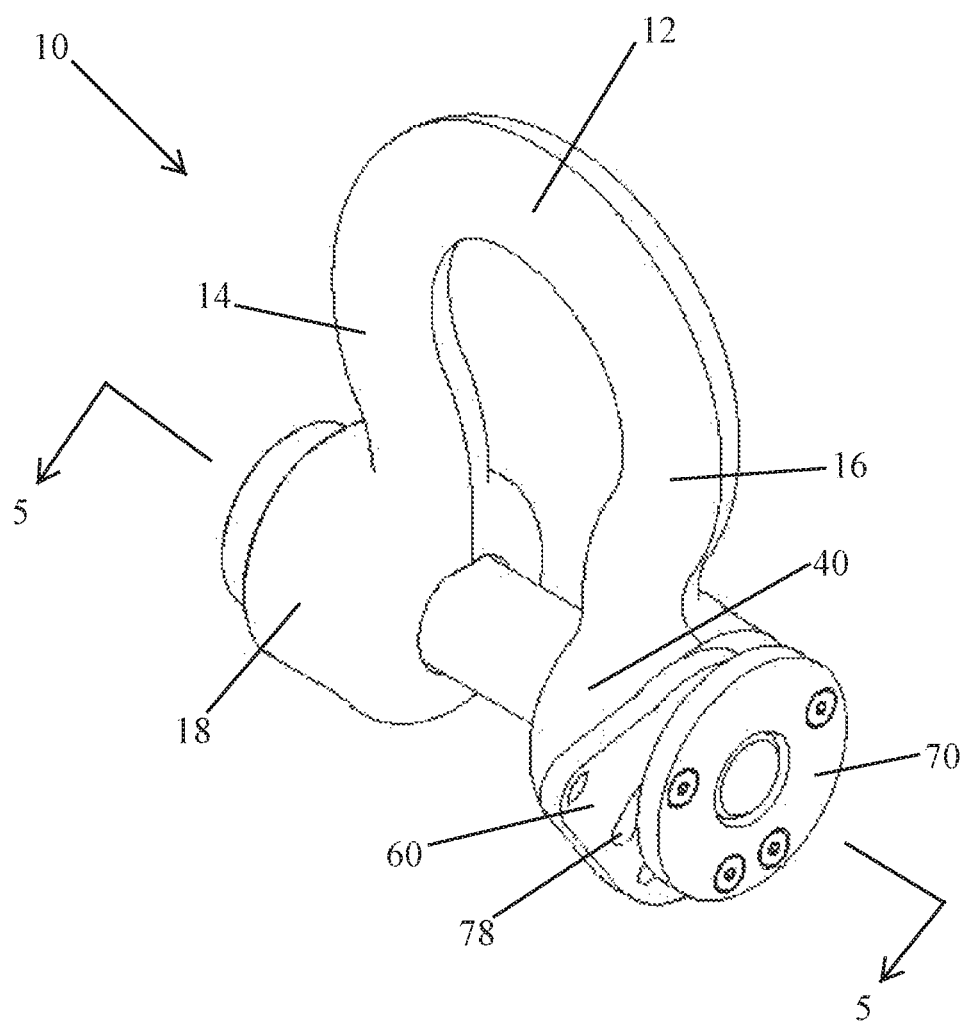
FIG. 4 illustrates a perspective view of the shackle with captured pin assembly shown in FIG. 1 with a rotating locking clip moved to an open position.
Figure 5:
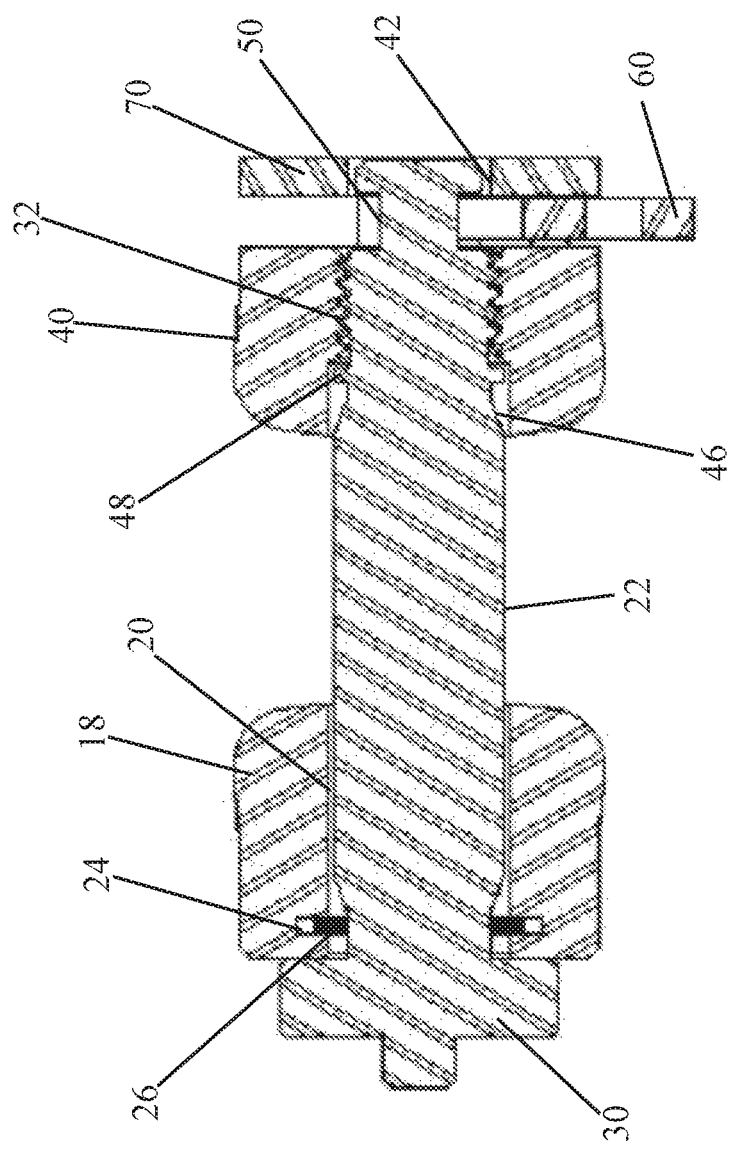
FIG. 5 illustrates a sectional view of the shackle with captured pin assembly taken along section line 5-5 of FIG. 4.

FIG. 4 illustrates a perspective view of the shackle with captured pin assembly 10 shown in FIG. 1 with the rotating locking clip 60 rotated out of the reduced diameter portion of the shackle pin 22, while FIG. 5 illustrates a sectional view taken along section line 5-5 of FIG. 4.

The present invention may act as a principal retention mechanism to secure the shackle pin 22 in the shackle 12, however, the present invention functions well as a secondary retention mechanism to the screw pin feature of the shackle bolt or pin 22.

Once the locking clip 60 has been rotated and moved to the unlocked position, the shackle pin 22 may then be unthreaded so that the threaded portion 32 of the shaft of the shackle pin 22 is disengaged from the threaded portion of the opening 42 in the second ear 40 of the shackle.

Returning to a consideration of FIG. 3, the second ear 40 includes a spring recess 80 which receives a coil spring 82 that engages a ball 84. The spring 82 urges the ball 84 to engage one of two detents in the locking clip 60. Accordingly, the locking clip 60 is urged to remain in either the fully locked or fully unlocked position, until moved by an operator.

Figure 6:
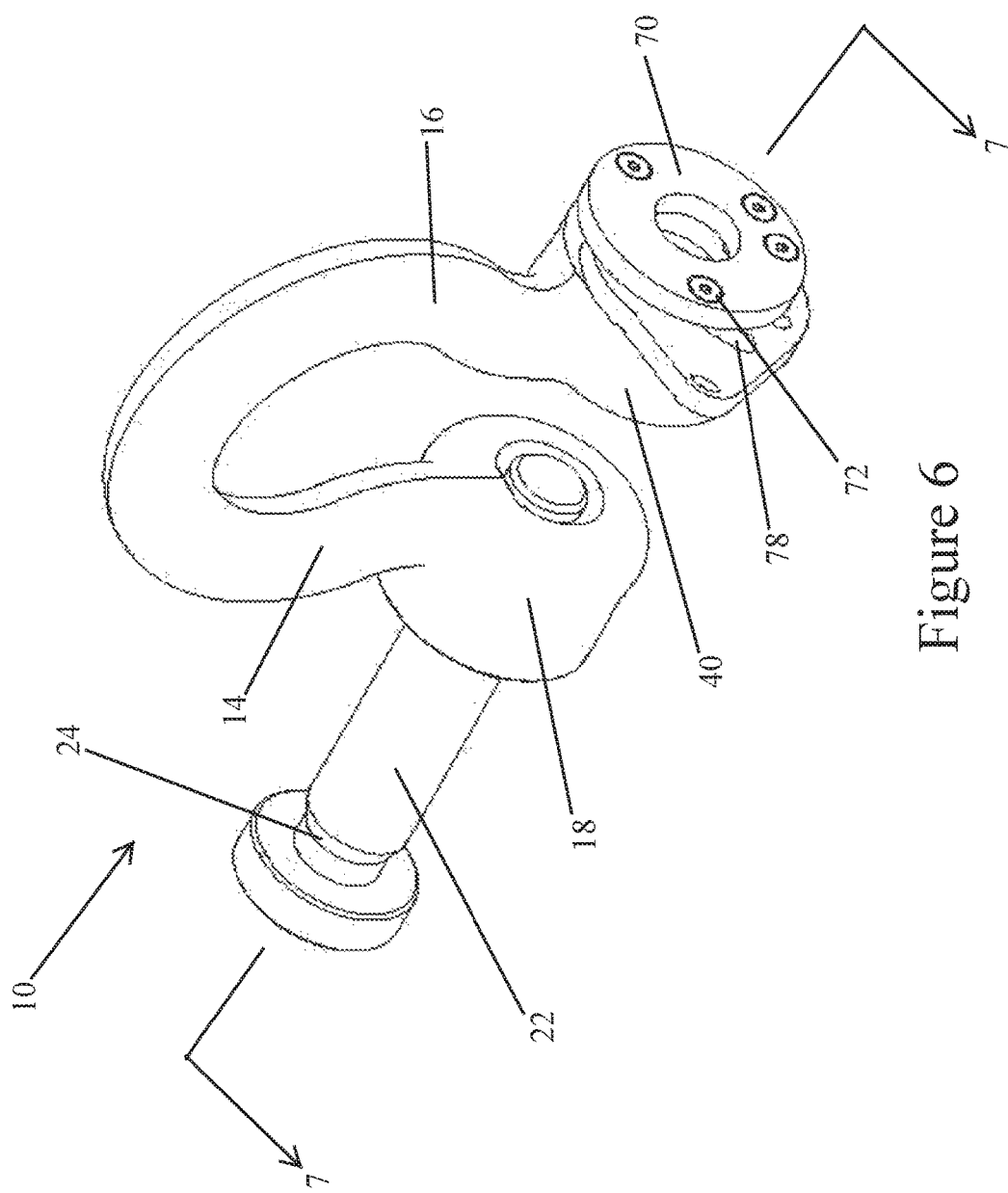
FIG. 6 illustrates a perspective view of the shackle with captured pin assembly shown in FIG. 1 with the locking clip in an open position and the shackle pin fully withdrawn.
Figure 7:
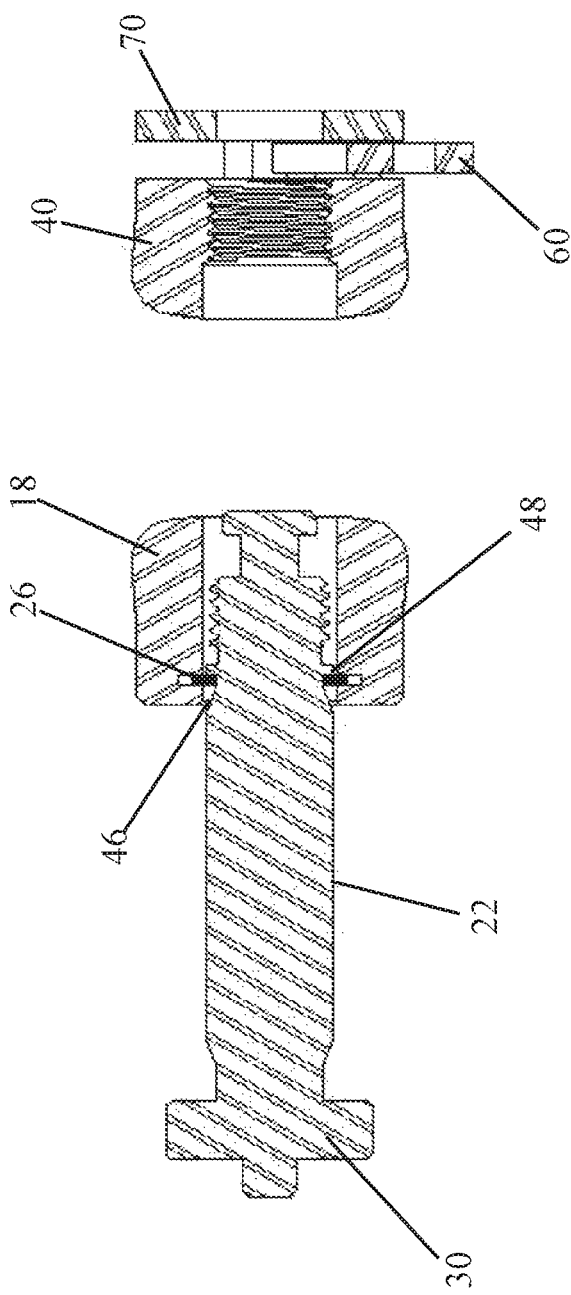
FIG. 7 illustrates a sectional view of the shackle with captured pin assembly taken along section line 7-7 of FIG. 6.

FIG. 6 illustrates a perspective view of the shackle with captured pin assembly 10 shown with the shackle pin 22 axially retracted, while FIG. 7 illustrates a sectional view taken along section line 7-7 of FIG. 6.

As best seen in FIG. 7, as the shackle pin 22 is retracted axially from the first ear 18, the split ring retaining spring clip 26 will engage the groove 46 in the shackle pin 22 so that the retaining spring clip 26 reduces in diameter into the groove 46. As the shackle pin 22 continues to be withdrawn, the spring clip 26 will engage a wall of the protruding portion 48 so that the shackle pin 22 will be prevented from being retracted further.

In one configuration, the groove 46, the protruding portion 48, and the split ring retaining spring clip 26 are designed so that the shackle pin 22 is retracted into the opening 42 so that full opening of the mouth of the shackle 12 may be utilized.

Figure 8:
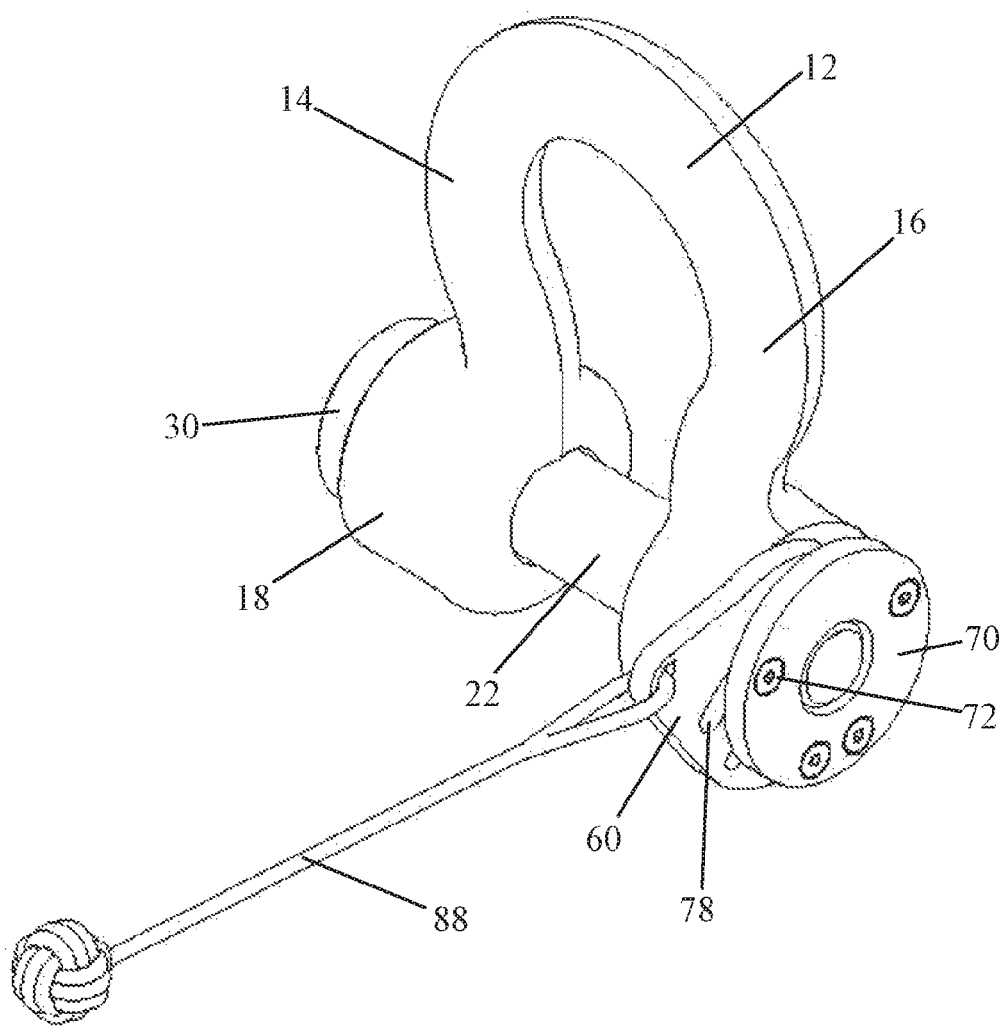
FIG. 8 illustrates a perspective view of the shackle with captured pin assembly utilizing a cord or lanyard to move the locking clip.

Finally, as seen in FIG. 8, a cord or lanyard 88 may be connected to the locking clip 60 in order to rotate the locking clip 60 between an unlocked position and a locked position by pulling on the cord or lanyard. The locking clip 60 may thus be moved manually by an operator. Alternatively, mechanical or robotic actuators (not shown) may also be used to move the locking clip.

As neither the locking clip 60 nor the shackle pin 22 is ever fully detached from the assembly 10, the possibility of dropped objects is reduced.

The rotating locking clip 60 may be in a different color than the shackle 12 so that an easy visual indicator is provided of the locked or unlocked position.

Figure 9:
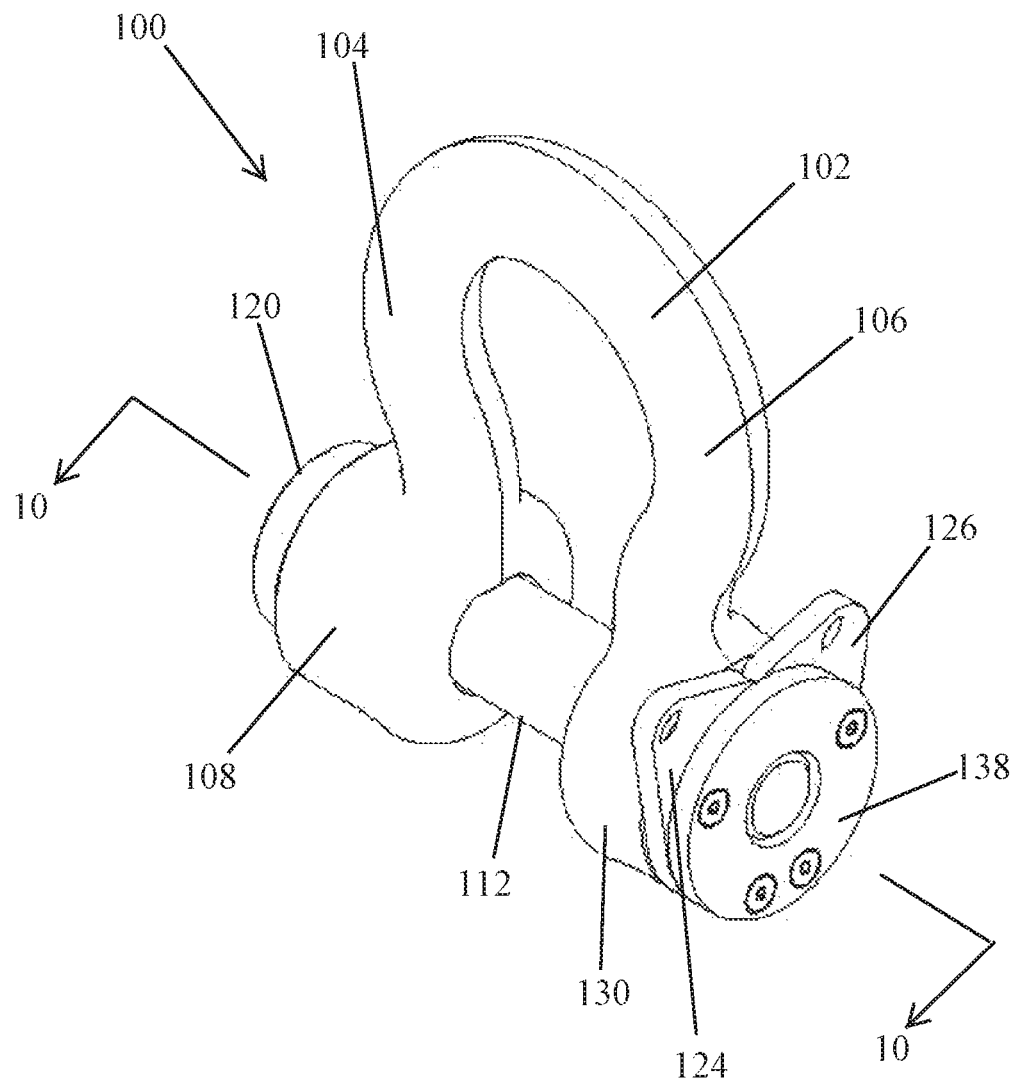
FIG. 9 illustrates a perspective view of a second preferred embodiment of a shackle with captured pin assembly.
Figure 10:
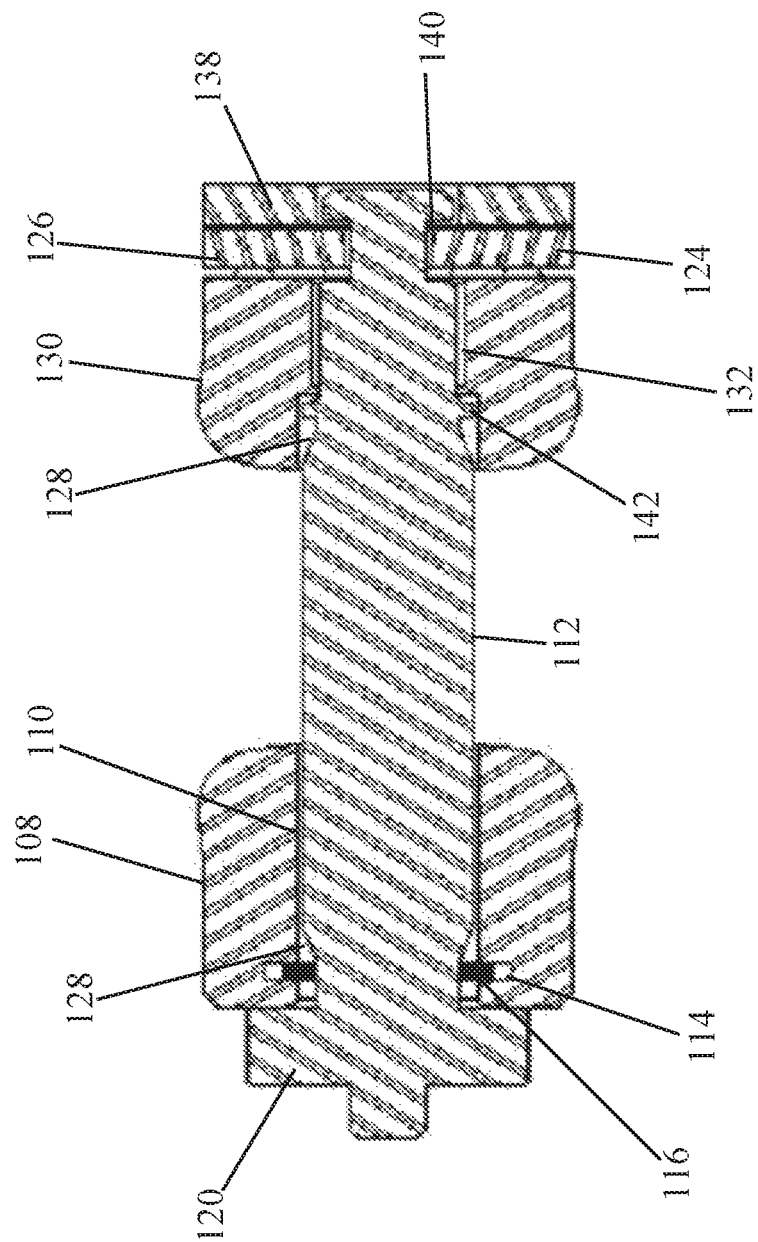
FIG. 10 illustrates a sectional view taken along section line 10-10 of FIG. 9.
Figure 11:
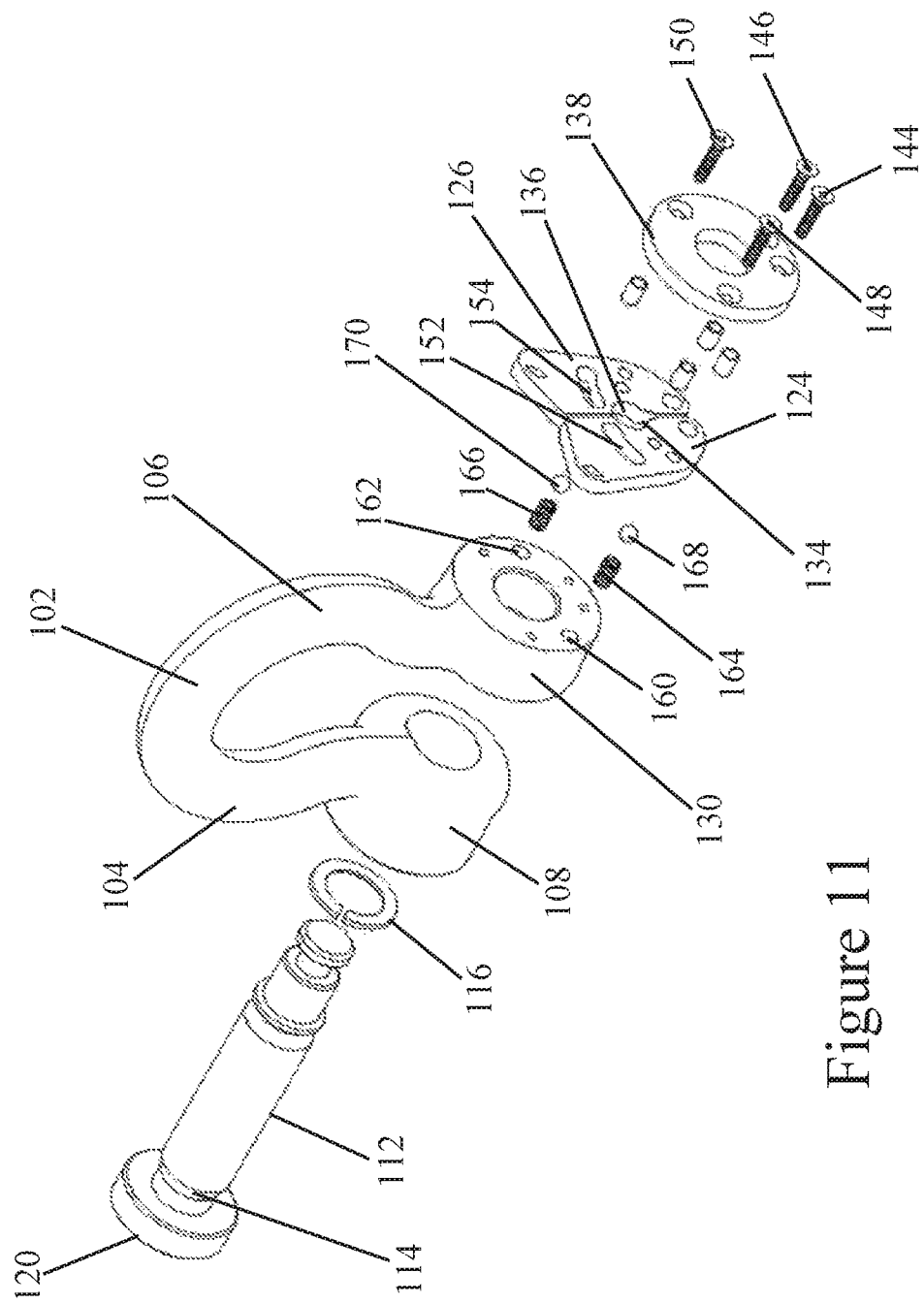
FIG. 11 illustrates an exploded view of the shackle with captured pin assembly as shown in FIG. 9.

FIG. 9 illustrates a perspective view of a second preferred embodiment of a shackle with captured pin assembly 100. FIG. 10 illustrates a sectional view taken along section line 10-10 of FIG. 9. FIG. 11 illustrates an exploded view of the shackle with captured pin assembly 100 as shown in FIG. 9.

As will be described herein, the assembly 100 is movable between a locked position shown in FIGS. 9 and 10 and an unlocked position.

The assembly 100 includes a shackle 102 having a pair of extending, opposed legs 104 and 106 which form an open mouth. Various types of shackles may be employed within the spirit and scope of the invention. Each of the legs 104 and 106 of the shackle terminates in a corresponding ear. One of the opposed legs 104 includes a first ear 108 having a substantially cylindrical opening 110 therethrough to receive a shackle bolt or pin 112.

An annular recess 114 (visible in FIG. 10) in the opening 110 in the first ear 108 receives a split ring retaining spring clip 116 which surrounds a shaft of the shackle pin 112. The spring clip 116 exerts a force urging reduction of the inner diameter of the opening of the clip 116.

The shackle bolt or pin 112 includes a head 120 at one end having a diameter larger than the cylindrical opening 110 in the first ear 108.

Another leg 106 of the shackle includes a second ear 130 having an opening 132 therethrough to receive the shackle pin 112. The opening 132 in the second ear 130 is aligned with the opening 110 in the first ear 108.

The shackle pin 112 also has a reduced diameter portion 140, with a smaller diameter than the shackle pin. The reduced diameter portion 140 is near but not at the end of the shackle pin 112 opposed to the head 120 of the shackle pin.

As will be described in detail, a pair of rotating locking clips 124 and 126 rotate about axes parallel to, but spaced from, the shackle pin 112 between a locked position and an unlocked position.

The shackle pin 112 has a groove 128 adjacent to a lip or radially protruding portion 142 protruding from the shaft of the shackle pin 112. The groove 128 has a diameter less than the diameter of the cylindrical shackle pin 112.

As best seen in the exploded view in FIG. 11, the rotating locking clips 124 and 126 each have a slot 134 and 136, respectively, which provide an opening smaller than the diameter of the shackle pin 112. When in the locked position as shown in FIGS. 9 and 10, the slots 134 and 136 of the rotating locking clips 124 and 126 are received over the reduced diameter portion 140 of the shackle pin 112. Once the rotating locking clips 124 and 126 are in place over the reduced diameter portion 140 of the shackle pin 112, the shackle pin 112 is prevented from being axially retracted or withdrawn. Accordingly, the shackle pin 112 is locked in place.

In one preferred embodiment shown, an optional cover 138 is secured to the second ear 130 by a series of fasteners 144, 146, 148 and 150. The fasteners pass through the cover 138 and into the second ear 130. Two fasteners 144 and 146 act as axes for rotation of the rotating locking clips 124 and 126. Accordingly, the rotating locking clips rotate about an axis parallel to, but spaced from, the axis of the shackle pins 112.

The other fasteners 148 and 150 pass through slots 152 and 154 in the rotating locking clips. Accordingly, the locking clips 124 and 126 may rotate without interference from the fasteners. Four fasteners are utilized in the present embodiment, although a greater or lesser number may be employed within the spirit and scope of the present invention.

Figure 12:
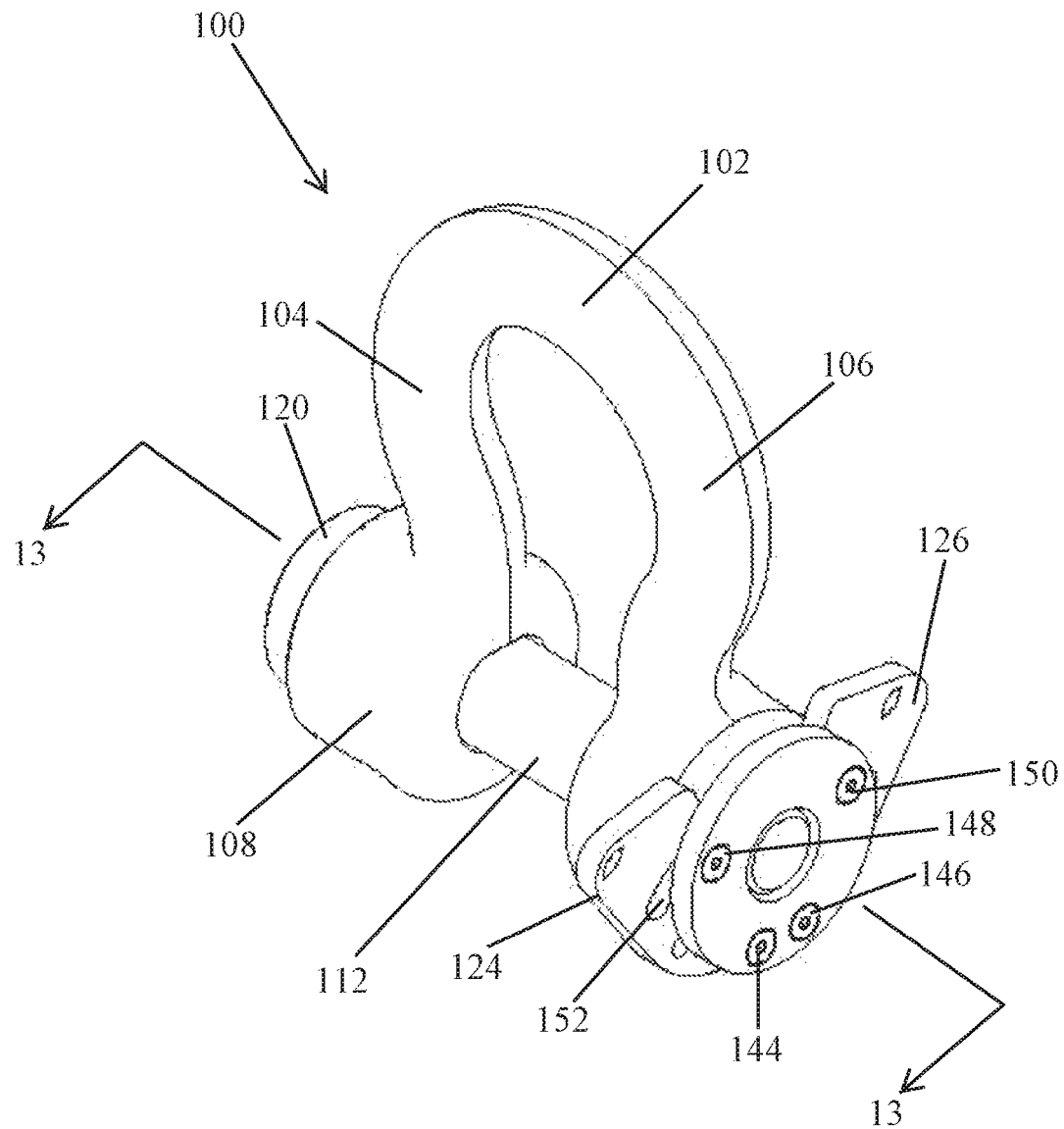
FIG. 12 illustrates a perspective view of the shackle with captured pin assembly shown in FIG. 9 with a pair of rotating locking clips moved to an open position.
Figure 13:
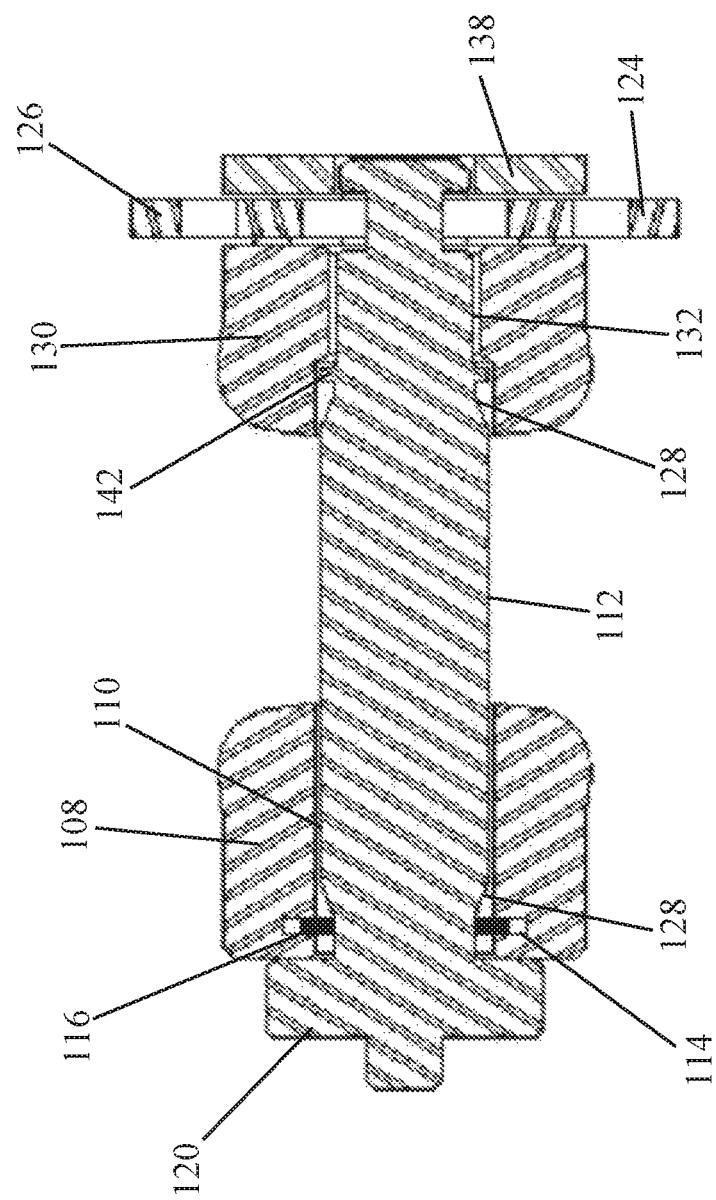
FIG. 13 illustrates a sectional view of the shackle with captured pin assembly shown in FIG. 9 taken along section line 13-13 of FIG. 12.

FIG. 12 illustrates a perspective view of the shackle with captured pin assembly 100 shown in FIG. 1 with the rotating locking clips 124 and 126 rotated out of the reduced diameter portion of the shackle pin 112, while FIG. 13 illustrates a sectional view taken along section line 13-13 of FIG. 12.

Once the locking clips 124 and 126 have been rotated and moved to the unlocked position, the shackle pin 112 is disengaged from the second ear 130 of the shackle 102.

Returning to a consideration of FIG. 11, the second ear 130 includes spring recesses 160 and 162 which receives coil springs 164 and 166 that engages balls 168 and 170. The springs 164 and 166 urge the balls to engage detents in the locking clips 124 and 126, respectively. Accordingly, the locking clips are urged to remain in either the fully locked or fully unlocked position.

Figure 14:
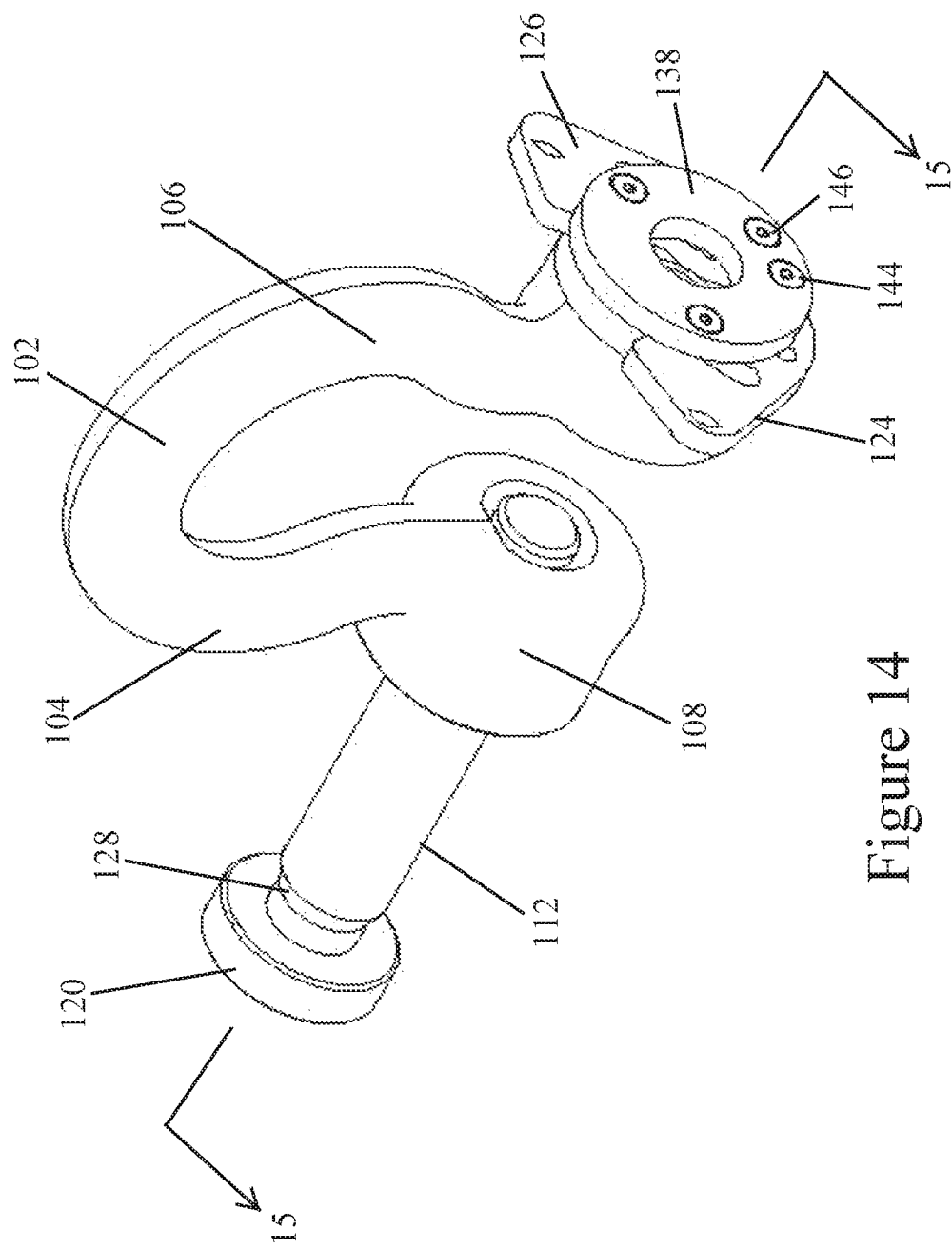
FIG. 14 illustrates a perspective view of the shackle with captured pin assembly shown in FIG. 9 with the locking clips in an open position and the shackle pin fully withdrawn.
Figure 15:
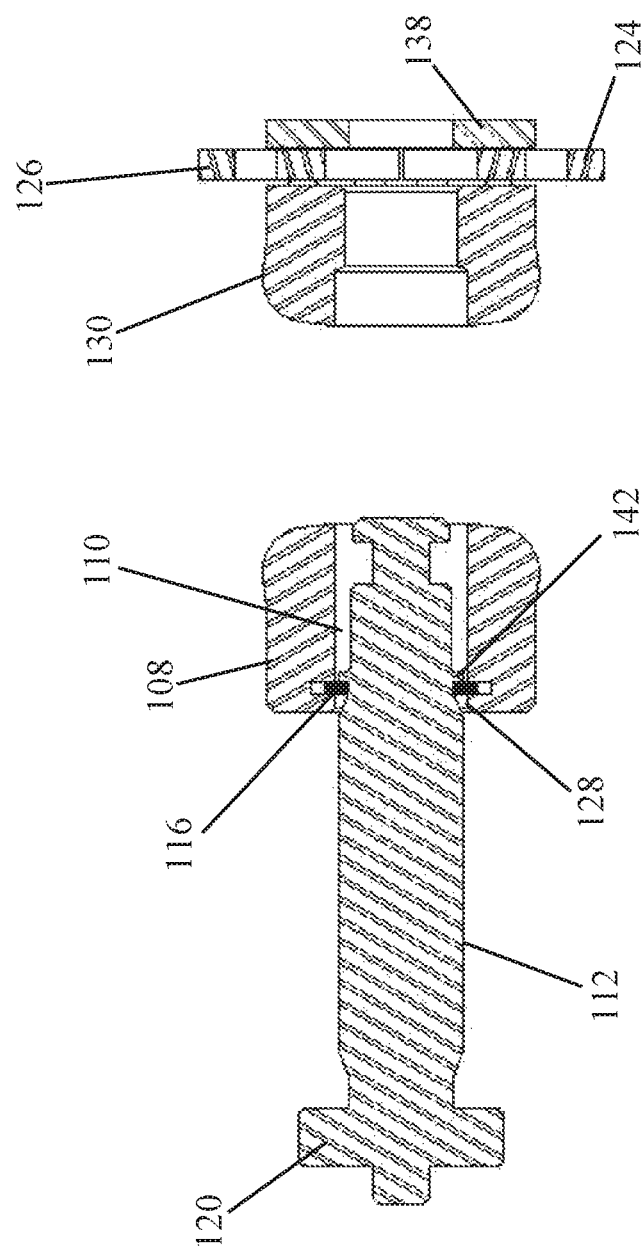
FIG. 15 illustrates a sectional view of the shackle with captured pin assembly taken along section line 15-15 of FIG. 14.

FIG. 14 illustrates a perspective view of the shackle with captured pin assembly 100 shown with the shackle pin 112 axially retracted, while FIG. 15 illustrates a sectional view taken along section line 15-15 of FIG. 14.

As best seen in FIG. 15, as the shackle pin 112 is retracted axially from the first ear 108, the split ring retaining spring clip 116 will engage the groove 128 in the shackle pin so that the retaining spring clip 116 reduces in diameter into the groove 128. As the shackle pin 112 continues to be withdrawn, the spring clip 116 will engage a wall of the protruding portion 142 so that the shackle pin 112 will be prevented from being retracted further.

In one configuration, the groove 128, the protruding portion 142, and the split ring retaining spring clip 116 are designed so that the shackle pin 112 is retracted into the opening 110 so that full opening of the mouth of the shackle 112 may be utilized.

Figure 16:
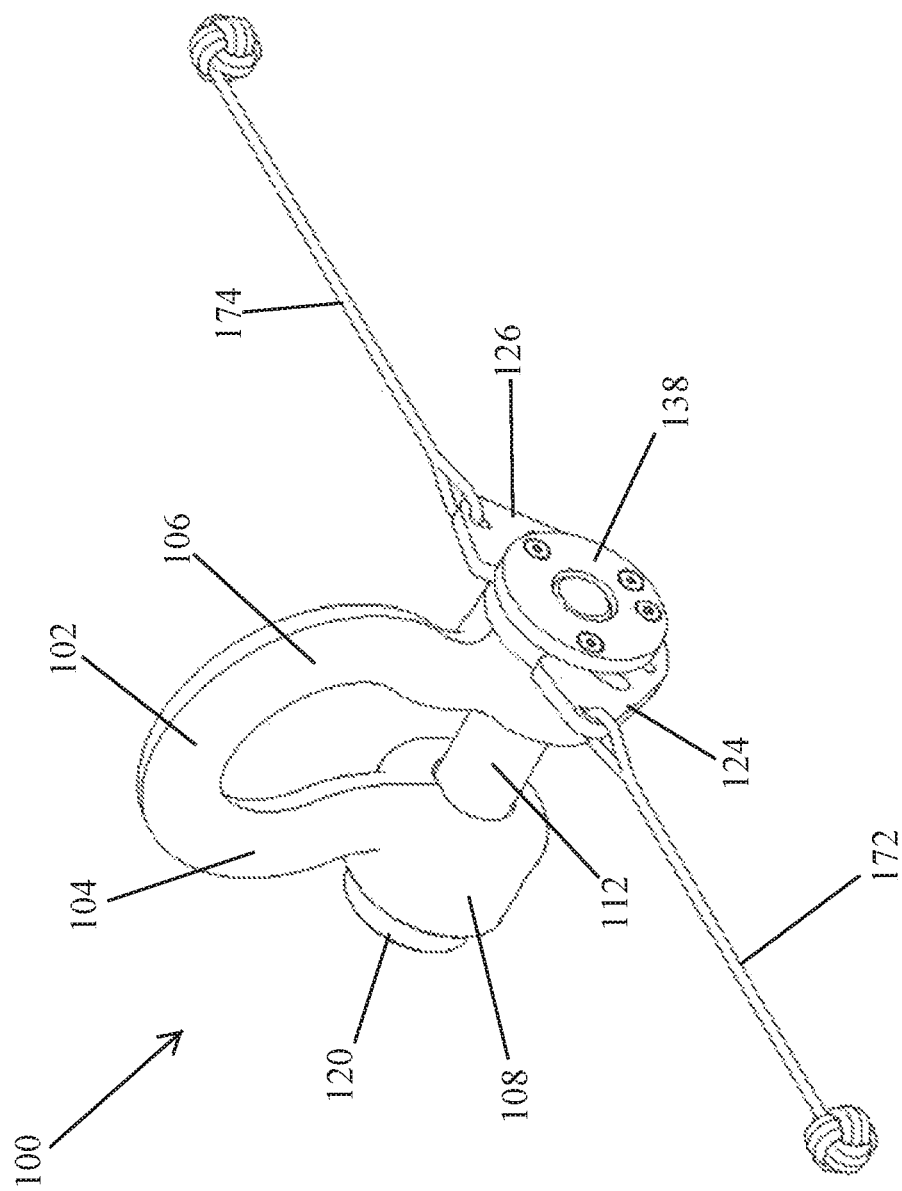
FIG. 16 illustrates a perspective view of the shackle with captured pin assembly shown in FIG. 9 utilizing a cord or lanyard to move the locking clips.

Finally, as seen in FIG. 16, cords or lanyards 172 and 174 may be connected to the locking clips 124 and 126 in order to rotate the locking clips 124 and 126 between an unlocked position and a locked position by pulling on the cord or lanyard. The locking clips may thus be moved manually by an operator. Alternatively, mechanical or robotic actuators (not shown) may also be used to move the locking clips.

As neither the locking clips 124 and 126 nor the shackle pin 112 is ever fully detached from the assembly, the possibility of dropped objects is reduced.

The rotating locking clip 60 may be in a different color than the shackle 112 so that an easy visual indicator is provided of the locked and unlocked position.

Whereas, the present invention has been described in relation to the drawings attached hereto, it should be understood that other and further modifications, apart from those shown or suggested herein, may be made within the spirit and scope of this invention.

What is claimed is:

1. A shackle with captured pin assembly, which assembly comprises:
    a shackle having a pair of opposed legs;
    a shackle pin;
    a first ear for one of said opposed legs, said first ear having an opening therethrough to receive said shackle pin and having a recess in said first ear opening to receive a spring clip surrounding a shaft of said shackle pin;
    a second ear for another of said opposed legs, said second ear opposed to said first ear and having an opening therethrough to receive said shackle pin, said second ear opening having a threaded portion;
    said shackle pin having a head at one end a threaded shaft portion near an opposed end engageable with said threaded portion of said second ear opening, and a reduced diameter portion near said opposed end; and
    a rotating retaining clip rotating about an axis parallel to said shackle pin between a locked position and an unlocked position, said rotating retaining clip having a slot providing an opening smaller than a diameter of said shaft of said shackle pin, wherein said slot is receivable over said reduced diameter portion in said locked position, and wherein a fastener passes through said rotating clip and into said second ear.

2. The shackle with captured pin assembly as set forth in claim 1 wherein said shackle pin has a groove adjacent to a radially protruding portion which engages said spring clip.

3. The shackle with captured pin assembly as set forth in claim 1 including a cover secured to said second ear so that said rotating retaining clip is between said second ear and said cover.

4. The shackle with captured pin assembly as set forth in claim 3 wherein said fastener passes through said cover, through said rotating retaining clip and into said second ear.

5. The shackle with captured pin assembly as set forth in claim 4 including a plurality of said fasteners wherein one of said fasteners acts as an axis for rotation of the rotating retaining clip.

6. The shackle with captured pin assembly as set forth in claim 1 including a lanyard extending from said rotating retaining clip for actuation of said retaining clip.

7. The shackle with captured pin assembly as set forth in claim 1 wherein said rotating retaining clip rotates about an axis parallel to but spaced from the axis of said shackle pin.

8. A shackle with captured pin assembly, which assembly comprises:
    a shackle having a pair of opposed legs;
    a shackle pin;
    a first ear for one of said opposed legs, said first ear having an opening therethrough to receive said shackle pin and having a recess in said first ear opening to receive a spring clip surrounding a shaft of said shackle pin;
    a second ear for another of said opposed legs, said second ear opposed to said first ear and having an opening therethrough to receive said shackle pin;
    said shackle pin having a head at one end, a shaft and a reduced diameter portion at an opposed end; and
    a rotating retaining clip rotating about an axis parallel to said shackle pin between a locked position and an unlocked position, said rotating retaining clip having a slot providing an opening smaller than a diameter of said shaft of said shackle pin, wherein said slot is receivable over said reduced diameter portion in said locked position, and wherein a fastener passes through said rotating clip and into said second ear.

9. The shackle with captured pin assembly as set forth in claim 8 wherein said shackle pin has a groove adjacent to a radially protruding portion which engages said spring clip.

10. The shackle with captured pin assembly as set forth in claim 8 including a cover secured to said second ear so that said rotating retaining clip is between said second ear and said cover.

11. The shackle with captured pin assembly as set forth in claim 10, wherein said fastener passes through said cover, through said rotating retaining clip and into said second ear.

12. The shackle with captured pin assembly as set forth in claim 11 including a plurality of said fasteners wherein one of said fasteners acts as an axis for rotation of said rotating retaining clip.

13. The shackle with captured pin assembly as set forth in claim 8 including a lanyard extending from said rotating retaining clip for actuation of said retaining clip.

14. The shackle with captured pin assembly as set forth in claim 8 wherein said rotating retaining clip rotates about an axis parallel to but spaced from the axis of said shackle pin.

* * * * *